US007658288B2

(12) United States Patent
Liu et al.

(10) Patent No.: US 7,658,288 B2
(45) Date of Patent: Feb. 9, 2010

(54) BISULFITE CONVERSION REAGENT

(75) Inventors: Yafei Liu, Beijing (CN); Haley O. Fiske, Pacifica, CA (US); Steven M. Menchen, Fremont, CA (US)

(73) Assignee: Applied Biosystems, LLC, Carlsbad, CA (US)

( * ) Notice: Subject to any disclaimer, the term of this patent is extended or adjusted under 35 U.S.C. 154(b) by 429 days.

(21) Appl. No.: 11/270,325

(22) Filed: Nov. 8, 2005

(65) Prior Publication Data

US 2006/0148853 A1 Jul. 6, 2006

Related U.S. Application Data

(60) Provisional application No. 60/626,228, filed on Nov. 8, 2004.

(51) Int. Cl.
*B65D 69/00* (2006.01)
*B65D 71/00* (2006.01)
*B65D 81/00* (2006.01)
*C01B 17/62* (2006.01)
*C02F 1/70* (2006.01)

(52) U.S. Cl. .................. 206/568; 206/569; 206/545; 206/223; 252/188.21; 252/188.2; 252/188.22; 252/188.28; 252/397

(58) Field of Classification Search ............ 252/188.21, 252/188.22; 206/568, 569
See application file for complete search history.

(56) References Cited

U.S. PATENT DOCUMENTS

| 3,888,969 | A | * | 6/1975 | Kawamoto et al. ....... 423/242.3 |
| 3,971,734 | A | * | 7/1976 | Bush ..................... 252/389.22 |
| 4,657,900 | A | * | 4/1987 | Powell et al. ............... 514/166 |
| 5,683,588 | A | * | 11/1997 | Pomrink et al. ............ 210/698 |
| 6,214,556 | B1 | | 4/2001 | Olek et al. |
| 6,251,594 | B1 | | 6/2001 | Gonzalgo et al. |
| 6,331,393 | B1 | | 12/2001 | Laird et al. |
| 6,451,289 | B2 | | 9/2002 | Wherry, III et al. |
| 6,511,810 | B2 | | 1/2003 | Bi et al. |
| 7,368,239 | B2 | * | 5/2008 | Zon et al. ...................... 435/6 |
| 2003/0191070 | A1 | * | 10/2003 | Oku et al. ...................... 514/23 |
| 2003/0215842 | A1 | | 11/2003 | Sledziewski et al. |
| 2004/0121359 | A1 | | 6/2004 | Berlin et al. |
| 2004/0152080 | A1 | | 8/2004 | Berlin et al. |
| 2005/0089898 | A1 | * | 4/2005 | Zon et al. ...................... 435/6 |
| 2005/0095623 | A1 | | 5/2005 | Zon et al. |
| 2006/0138399 | A1 | * | 6/2006 | Itano et al. .................... 257/40 |

FOREIGN PATENT DOCUMENTS

| EP | 1394173 A1 | 3/2004 |
| JP | 1995/265082 A | 10/1995 |
| WO | 02/30944 A2 | 4/2002 |
| WO | 02/31186 A2 | 4/2002 |
| WO | 03/031649 A2 | 4/2003 |
| WO | 2004/067545 A1 | 8/2004 |
| WO | 2005/021563 A2 | 3/2005 |

OTHER PUBLICATIONS

Solvay Chemicals, Inc. "Sodium Bisulfite Solution Material Safety Data Sheet", (Oct. 6, 2003).*
U.S. Appl. No. 10/926,528, filed Aug. 26, 2004, Zon.
U.S. Appl. No. 10/926,539, filed Aug. 26, 2004, Zon.
U.S. Appl. No. 10/926,531, filed Aug. 26, 2004, Zon.
U.S. Appl. No. 10/926,534, filed Aug. 26, 2004, Zon.
U.S. Appl. No. 11/231,779, filed Sep. 21, 2005, Zon.
Balog, et al., "Parallel Assessment of CpG Methylation by Two-Color Hybridization with Oligonucleotide Arrays", Analytical Biochemistry, 309 (2002) 301-310.
Boyd, et al., "Bisulfite Conversation of Genomic DNA for Methylation Analysis: Protocol Simplification with Higher Recovery Applicable to Limited Samples and Increased Throughput", Analytical Biochemistry, Academic Press, San Diego, CA, U.S., vol. 326, No. 2, Mar. 15, 2004, pp. 278-280.
Clark, et al., "High Sensitivity Mapping of Methylated Cytosines", 2990-2997, Nucleic Acids Research, 1994, vol. 22, No. 15.
El-Maarri, et al., "A Rapid, Quantitative, Non-Radioactive Bisulfite-SNuPE-IP RP HPLC Assay for Methylation Analysis at Specific CpG Sites", Nucleic Acids Research, 2002, vol. 30, No. 6, e25.
EZ DNA Methylation Kit™, Instructions, Zymo Research, Mar. 11, 2003.
Fraga and Esteller, "DNA Methylation: A Profile of Methods and Applications", BioTechniques 33:632-649 (Sep. 2002).
Frigola, et al., "Methylome Profiling of Cancer Cells by Amplification of Inter-Methylated Sites (AIMS)", Nucleic Acids Research, 2002, vol. 30, No. 7 e28.
Friso, et al., "A Method to Assess Genomic DNA Methylation Using High-Performance Liquid Chromatography/Electrospray Ionization Mass Spectrometry", Anal. Chem. 2002, 74, 4526-4531.
Frommer, et al., "A Genomic Sequencing Protocol That Yields a Positive Display of 5-Methylcytosine Residues in Individual DNA Strands", Proc. Natl. Acad. Sci. USA, vol. 89, pp. 1827-1831, Mar. 1992, Genetics.
Grunau, et al., "Bisulfite Genomic Sequencing: Systematic Investigation of Critical Experimental Parameters", Nucleic Acids Research, 2001, vol. 29, No. 13, e65.
Hayatsu, et al., "Reaction of Sodium Bisulfite with Uracil, Cytosine, and Their Derivatives", Biochemistry, vol. 9, No. 14, 1970, pp. 2858-2865.
Hayatsu, Hikoya, "Bisulfite Modification of Nucleic Acids and Their Constituents", Prog Nucleic Acid Res Mol Biol, 1976, 16, 75-124.
Herman, et al., "Methylation-specific PCR: A Novel PCR Assay for Methylation Status of CpG Islands", Proc. Natl. Acad. Sci. USA, vol. 93, pp. 9821-9826, Sep. 1996, Medical Sciences.
Humeny, A., et al., "Detection and Analysis of Enzymatic DNA Methylation of Oligonucleotide Substrates by Matrix-Assisted Laser Desorption Ionization Time-of-Flight Mass Spectrometry", Anal. Biochem. 313(2003) 160-166.
Kerjean, et al., "Bisulfite Genomic Sequencing of Microdissected Cells", Nucleic Acids Research, 2001, vol. 29, No. 21 e106.

(Continued)

*Primary Examiner*—Joseph D Anthony
(74) *Attorney, Agent, or Firm*—Peggy Radel

(57) ABSTRACT

Disclosed, among other things, are packaged bisulfite solutions comprising bisulfite reagent in an oxygen-impermeable container and methods.

20 Claims, No Drawings

OTHER PUBLICATIONS

Kinoshita, H., et al., Screening Hypermethylated Regions by Methylation-Sensitive Single-Strand Conformational Polymorphism, Anal. Biochem 278. (2000) 165-169.

Komiyama, et al., "Catalysis of Diethylenetriamine for Bisulfite-Induced Deamination of Cytosine in Oligodeoxyribonucloetides," *Tetrahedron Letters* (1994) 35(44): 8185-8188.

Kubareva, et al., "Determination of Methylation Site of DNA-Methyl-Transferase Nylax by a Hybrid Method", BioTechniques, Eaton Publishing, Natick, U.S., vol. 33, No. 3, Sep. 2002, pp. 526-531.

Kumar, et al., "Immunoaffinity Chromatography to Isolate Methylated DNA Using Immobilized Anti-5 Methyl Cytosine Antibody", Biotechnology Techniques, vol. 5, No. 6, 469-470 (1991).

Li and Dahiya, "MethPrimer: Designing Primers for Methylation PCRs", Bioinformatics, vol. 18, No. 11, 2002, pp. 1427-1431.

Miller and Cushman, "Selective Modification of Cytosines in Oligodeoxyribonucleotides," Bioconjugate Chem 1992, 3, 74-79.

Mills and Ramsahoye, "DNA Methylation Protocols", Methods in Molecular Biology, vol. 200 (2002).

Molander, et al., "Bisulfite Ion-Catalyzed Transamination of Cytosine Residues with α, ω-Alkanediamines: The Effect of Chain Length on the Reaction Kinetics", Bioconjugate Chem. 1993, 4, 362-365.

Okamoto, et al., "Site-Specific Discrimination of Cytosine and 5-Methylcytosine in Duplex DNA by Peptide Nucleic Acids", JACS Communications (Apr. 10, 2002).

Oakeley, "DNA Methylation Analysis: A Review of Current Methodologies", Pharmacology & Therapeutics 84 (1999) 389-400.

Oakeley, et al., "Quantification of 5-Methylcytosine in DNA by the Chloroacetaldehyde Reaction", BioTechniques 27: 744-752 (Oct. 1999).

Olek, et al., "A Modified and Improved Method for Bisulphite Based Cytosine Methylation Analysis", Nucleic Acids Research, 1996, vol. 24, No. 24, pp. 5064-5066.

Paul and Clark, "Cytosine Methylation: Quantitation by Automated Genomic Sequencing and GENESCAN™ Analysis", BioTechniques 21: 126-133 (Jul. 1996).

Paulin, et al., "Urea Improves Efficiency of Bisulphite-Mediated Sequencing of 5'-Methylcytosine in Genomic DNA", Nucleic Acids Research, 1998, vol. 26, No. 21, 5009-5010.

Rand, et al., "Conversion-Specific Detection of DNA Methylation using Real-Time Polymerase Chain Reaction (ConLight-MSP) to Avoid False Positives", Methods, 27 (2002), 114-120.

Rein, et al., "Active Mammalian Replication Origins Are Associated With a High-Density Cluster of mCpG Dinulceotides", Molecular and Cellular Biology, Jan. 1997, vol. 17, No. 1, pp. 416-426.

Sadegh and Schreck, "The Spectroscopic Determination of Aqueous Sulfite Using Ellman's Reagent", Reports, vol. 8 (2003) MURJ 39.

Shapiro and Klein, "Reactions of Cytosine Derivatives with Acidic Buffer Solutions", Biochemistry, vol. 6, No. 11, Nov. 1967, pp. 3576-3582.

Shapiro and Weisgras, "Bisulfite-Catalyzed Transamination of Cytosine and Cytidine", Biochemical and Biophysical Research Communications, vol. 40, No. 4, 1970, pp. 839-843.

Shapiro, et al., "Reactions of Uracil and Cytosine Derivatives with Sodium Bisulfite. A Specific Deamination Method", Journal of the American Chemical Society, 92:2, Jan. 28, 1970.

Shapiro, et al., "Nucleic Acid Reactivity and Conformation", The Journal of Biological Chemistry, vol. 248, No. 11, Issue of Jun. 10, pp. 4060-4064, 1973.

Shapiro, et al., "Deamination of Cytosine Derivatives by Bisulfite. Mechanism of the Reaction", Journal of the American Chemical Society, 96:3, Feb. 6, 1974.

Thomassin, et al., "Identification of 5-Methylcytosine in Complex Genomes", Methods, 19,465-475 (1999).

Trinh, et al., "DNA Methylation Analysis by MethyLight Technology", Methods 25, 456-462 (2001).

Ushijima, et al., "Fidelity of the Methylation Pattern and Its Variation in the Genome", Genome Research (2003), pp. 868-874.

Wang, et al., "Comparison of Bisulfite Modification of 5-Methyldeoxcytidine and Deoxycytidine Residues", Nucleic Acids Research, vol. 8, No. 20, 1989, pp. 4776-4790.

Warnecke, et al., "Bisulfite Sequencing in Preimplantation Embryos: DNA Methylation Profile of the Upstream Region of the Mouse Imprinted H19 Gene", Genomics 51, 182-190 (1990), Article No. GE985371.

International Search Report mailed Jan. 31, 2005 from International Application No. PCT/US2004/028089.

International Search Report mailed Apr. 15, 2005 from International Application No. PCT/US04/27992.

International Search Report mailed May 18, 2005 from International Application No. PCT/US04/28070.

International Search Report mailed Jun. 27, 2005 from International Application No. PCT/US2004/028032.

International Search Report mailed Jun. 14, 2006 from International Application No. PCT/US05/33639.

* cited by examiner

BISULFITE CONVERSION REAGENT

This application claims a priority benefit under 35 U.S.C. § 119(e) from U.S. Application Ser. No. 60/626,228 filed Nov. 8, 2004, and is incorporated herein by reference.

The present teachings relate generally to methods and materials for the specific conversion of cytosine to uracil.

Assessment of methylation of DNA is useful in many research, diagnostic, medical, forensic, and industrial fields. Particularly, methylation of cytosine in genomic DNA has been correlated with lack of gene expression, and in some instances can be indicative of early and frequent alterations found in some cancers. Thus, the ability to assess the methylation status of DNA is significant.

Assessment of DNA methylation generally involves the conversion of cytosine to uracil. One basic method for such conversion employs sodium bisulfite. Over the years, the method has been improved in attempts to overcome disadvantages that include tedious procedures, lengthy reaction times, and DNA degradation. One commonly used sodium bisulfite conversion protocol is taught by J. Herman, see Herman, J., *Proc. Natl. Acad. Sci.* 93, 9821-26 (1996), incorporated herein by reference in its entirety. Despite the attempts to improve the protocol, it is still required to prepare fresh solutions of sodium bisulfite ($NaHSO_3$) that include a stabilizing reagent (antioxidant) such as hydroquinone. Generally, the protocol also involves long reaction times and tedious clean-up procedures.

Given the importance of assessment of DNA methylation, it can be seen that there is a need for improved reagents and methods for conversion of cytosine to uracil.

In some embodiments, the present teachings provide for a packaged bisulfite solution comprising an aqueous deoxygenated solution of a bisulfite reagent enclosed within an oxygen-impermeable container, wherein after six months, the solution has a bisulfite concentration that is at least 90% of the original concentration. In some embodiments, the solution contains less than 10 ppm dissolved oxygen.

In some embodiments, the bisulfite reagent can comprise at least one counter-ion selected from a monovalent ion, a divalent ion and combinations thereof. In some embodiments, the counter-ion can be a monovalent ion. In some embodiments, the counter-ion can be a monovalent ion selected from sodium, lithium, potassium, ammonium, tetraalkylammonium and combinations thereof. In some embodiments, the counter-ion can be a divalent ion. In some embodiments, the counter-ion can be a divalent ion selected from magnesium, manganese, calcium and combinations thereof. In some embodiments, the bisulfite counter-ion can be ammonium. In some embodiments, the bisulfite counter-ion can be tetraalkylammonium.

In some embodiments, the oxygen-impermeable container can be selected from an ampoule, a hermetically sealed bag, a capsule, etc. In some embodiments, the oxygen-impermeable container can be an ampoule. In some embodiments, the ampoule can be an amber glass ampoule. In some embodiments, the oxygen-impermeable container can be a capsule. In some embodiments, the capsule can comprise a substantially oxygen-impermeable thermal plastic polymer. In some embodiments, the present teachings provide for kits comprising packaged bisulfite solutions described herein.

It is to be understood that both the foregoing general description and the following detailed description are exemplary and explanatory only and are not restrictive of the invention, as claimed. In this application, the use of the singular includes the plural unless specifically stated otherwise. In this application, the use of "or" means "and/or" unless stated otherwise. Furthermore, the use of the term "comprising", as well as other forms, such as "comprises" and "comprised", is not intended to be limiting.

In some embodiments, the present teachings provide for a packaged bisulfite solution comprising an aqueous deoxygenated solution of a bisulfite reagent enclosed within an oxygen-impermeable container, wherein said solution contains less than 10 ppm dissolved oxygen and wherein after six months, the solution has a bisulfite concentration that is at least 90% of the original concentration.

In some embodiments, the aqueous deoxygenated solution can be a solution containing bisulfite ion in a concentration of from about 0.5 molar (e.g. ~0.5M) to about 2.5M. In further embodiments, the solution contains bisulfite ion in a concentration of from about 1M to about 2M.

In some embodiments, the bisulfite is present at a concentration of at least about 1M.

In some embodiments, after six months, the bisulfite solution can have a bisulfite concentration that is at least 90% of the original concentration. In some embodiments, after six months, the bisulfite solution can have a bisulfite concentration that is at least 95% of the original concentration. In some embodiments, after six months, the bisulfite solution can have a bisulfite concentration that is at least 99% of the original concentration. Bisulfite concentration can be determined by, for example, spectroscopic determination using Ellman's reagent or iodine titration using a starch indicator according to the following reaction (see, for example, Sadegh, C., et al., *MIT Undergraduate Research Journal*, 8, 39-42 (2003) and references cited therein):

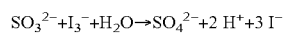

$$SO_3^{2-} + I_3^- + H_2O \rightarrow SO_4^{2-} + 2\,H^+ + 3\,I^-$$

As used herein, bisulfite ion has its accustomed meaning of $HSO_3^-$. Typically, bisulfite is used as an aqueous solution of a bisulfite salt, for example magnesium bisulfite, which has the formula $Mg(HSO_3)_2$, and sodium bisulfite, which has the formula $NaHSO_3$.

Suitable counter-ions for the bisulfite compound may be monovalent or divalent. Examples of monovalent cations include, without limitation, sodium, lithium, potassium, ammonium, and tetraalkylammonium. Suitable divalent cations include, without limitation, magnesium, manganese, and calcium.

In some embodiments, the bisulfite solution can further comprise a quaternary ammonium catalyst. The term "quaternary ammonium catalyst" includes, without limitation, salts of quaternary ammonium compounds, including without limitation quaternary alkyl ammonium salts. Examples of quaternary ammonium catalysts include, but are not limited to, quaternary alkyl ammonium halides, for example quaternary methyl ammonium bromide, quaternary ammonium chlorides, tetraethyl ammonium hydroxide, tetraethylammonium chloride, tetrabutyl ammonium chloride, tetrabutyl ammonium bromide, and the like. A more detailed discussion of uses of quaternary ammonium catalysts is provided in U.S. Provisional Patent Application Nos. 60/499,106 and 60/523,054, each of which is incorporated herein by reference in its entirety for all it discloses.

In some embodiments of the invention, the quaternary amine catalyst comprises a quaternary ammonium compound, or a derivative thereof. In further embodiments, the quaternary amine catalyst comprises a quaternary alkyl ammonium salt. In yet further embodiments, the quaternary amine catalyst comprises a quaternary alkyl ammonium halide, for example a quaternary ammonium chloride or a quaternary ammonium bromide. In some embodiments, the quaternary amine catalyst comprises at least one of quaternary methyl ammonium bromide, tetraethyl ammonium hydroxide, tetraethylammonium chloride, tetrabutylammonium chloride and tetrabutylammonium bromide.

In some embodiments, the bisulfite solution further comprises a polyamine catalyst. As used herein, the term "polyamine" is intended to refer to compounds having more than one amine group, and their salts. Thus, "polyamines" include, without limitation, diamines, triamines such as diethylene triamine (DETA), guanidine and tetramethyl guanidine; tetraamines, such as spermine; compounds having the Formula I as disclosed herein, and other compounds containing two or more amine groups, and salts of the same. As used herein, the term "triamine" refers to compounds having three amino groups, including but not limited to diethylene triamine (DETA), guanidine HCl, tetramethyl guanidine, and the like. A more thorough discussion of uses of polyamine catalysts is provided in U.S. Provisional Patent Application Nos. 60/520,942 and 60/499,113, now U.S. Patent No. 7,368,239, each of which is incorporated herein by reference in their entirety for all they disclose.

Suitable oxygen-impermeable containers include, but are not limited to, ampoules, hermetically sealed bags, capsules, oxygen-impermeable vials, and the like. In some embodiments, the oxygen-impermeable container can be an oxygen impermeable vial. Suitable oxygen-impermeable vials include, but are not limited to, glass or plastic screw-top vials having a sealing film adhered to the upper edge of the vial opening. Suitable sealing films include, but are not limited to, oxygen-impermeable thermal plastic polymer, such as Barex® films.

In some embodiments, the oxygen-impermeable container can be an ampoule. In some embodiments, the oxygen-impermeable container can be an amber glass ampoule. In some embodiments, the oxygen-impermeable container can be a plastic ampoule. Suitable ampoules and methods of filling ampoules are well known in the art. As used herein "ampoule" refers to any glass or plastic vial that is hermetically sealed and broken-off at one end to release the contents held therein. Plastic ampoules can also include, but are not limited to, those described in U.S. Pat. Nos. 6,379,069 and 6,641,319. In some embodiments, the oxygen-impermeable container can be a capsule. In some embodiments, the oxygen-impermeable container can be a vial or an Eppendorf tube that is hermetically sealed inside a bag or other oxygen-impermeable flexible package. Oxygen-impermeable packages can include those comprising a Barex® film.

In some embodiments the solution contains less than 10 ppm dissolved oxygen. In some embodiments the solution contains less than 5 ppm dissolved oxygen. In some embodiments the solution contains less than 1 ppm dissolved oxygen. The amount of dissolved oxygen can be determined by, for example, commercially available meters, such as the DO 4000 dissolved oxygen meter (Lamotte Co., Chestertown, Md.).

One of skill in the art could prepare a packaged bisulfite solution of the present teachings by dispensing water into a container of the type described above, degassing the water by bubbling a non-reactive gas through the water for 10 minutes, adding reagents to form a bisulfite solution useful in DNA methylation analysis, degassing the solution a second time, and sealing the container. Suitable non-reactive gases include, but are not limited to, nitrogen ($N_2$), helium (He) and argon (Ar). Suitable reagents include those described above.

In some embodiments, the invention provides for kits for carrying out sodium bisulfite conversion of cytosine to uracil. In one embodiment, a kit of the invention comprises a packaged bisulfite solution according to the present teachings, and optionally includes other pre-measured ingredients required for carrying out the bisulfite reaction. In some embodiments, the present teachings provide for a kit containing pre-packaged materials sufficient to prepare multiple samples. In some embodiments, the materials will be pre-packaged in suitable containers, such as Eppendorf tubes or other vessels as described above, as appropriate.

All documents, or portions of documents, cited in this application, including but not limited to patents, patent applications, articles, books, and treatises, are hereby expressly incorporated by reference in their entirety for any purpose.

The various embodiments described herein are merely illustrative embodiments meant to describe the invention. Applicant does not limit the invention to these embodiments. Rather, applicant acknowledges that those reasonably skilled in the art will readily recognize additional variants that do not differ from the scope and spirit of the invention.

The invention claimed is:

1. A kit containing a pre-packaged bisulfite solution suitable for use in a DNA methylation analysis reaction involving the conversion of cytosine to uracil wherein said pre-packaged bisulfite solution comprises an aqueous deoxygenated solution of a bisulfite reagent enclosed within an oxygen-impermeable container such that the pre-packaged bisulfite solution maintains a bisulfite concentration that is at least 90% of the original concentration and useable in the DNA methylation analysis reaction for a period of approximately six months after packaging in said kit.

2. The pre-packaged bisulfite solution of claim 1, wherein the bisulfite reagent comprises at least one counter-ion selected from a monovalent ion, a divalent ion and combinations thereof.

3. The pre-packaged bisulfite solution of claim 2, wherein the counter-ion comprises a monovalent ion.

4. The pre-packaged bisulfite solution of claim 2, wherein the counter-ion comprises a monovalent ion selected from sodium, lithium, potassium, ammonium, tetraalkylammonium and combinations thereof.

5. The pre-packaged bisulfite solution of claim 4, wherein the counter-ion comprises sodium.

6. The pre-packaged bisulfite solution of claim 4, wherein the counter-ion comprises lithium.

7. The pre-packaged bisulfite solution of claim 4, wherein the counter-ion comprises potassium.

8. The pre-packaged bisulfite solution of claim 4, wherein the counter-ion comprises ammonium.

9. The pre-packaged bisulfite solution of claim 4, wherein the counter-ion comprises tetraalkylammonium.

10. The pre-packaged bisulfite of claim 2, wherein the counter-ion comprises a divalent ion.

11. The pre-packaged bisulfite solution of claim 2, wherein the counter-ion comprises a divalent ion selected from magnesium, manganese, calcium and combinations thereof.

12. The pre-packaged bisulfite solution of claim 11, wherein the counter-ion comprises magnesium.

13. The pre-packaged bisulfite solution of claim 11, wherein the counter-ion comprises manganese.

14. The pre-packaged bisulfite solution of claim 11, wherein the counter-ion comprises calcium.

15. The pre-packaged bisulfite solution according to claim 1 wherein the oxygen-impermeable container is selected from an ampoule, a hermetically sealed bag, and a capsule.

16. The pre-packaged bisulfite solution of claim 15, wherein the oxygen-impermeable container comprises an ampoule.

17. The pre-packaged bisulfite solution of claim 16, wherein the ampoule comprises an amber glass ampoule.

18. The pre-packaged bisulfite solution of claim 15, wherein the oxygen-impermeable container comprises a capsule.

19. The pre-packaged bisulfite solution of claim 18, wherein the capsule comprises a substantially oxygen-impermeable thermal plastic polymer.

20. The pre-packaged bisulfite solution according to claim 1, wherein the bisulfite solution contains less than 10 ppm dissolved oxygen.

* * * * *